United States Patent
Reams

(10) Patent No.: US 7,593,318 B2
(45) Date of Patent: Sep. 22, 2009

(54) METHOD AND APPARATUS FOR HEADER UPDATING

(76) Inventor: Byron L. Reams, 607 Cameron Ct., Lexington, SC (US) 29072

( * ) Notice: Subject to any disclaimer, the term of this patent is extended or adjusted under 35 U.S.C. 154(b) by 940 days.

(21) Appl. No.: 10/041,543

(22) Filed: Jan. 7, 2002

(65) Prior Publication Data

US 2003/0128699 A1 Jul. 10, 2003

(51) Int. Cl.
*G01R 31/08* (2006.01)
(52) U.S. Cl. ............... 370/216; 370/250; 370/474
(58) Field of Classification Search ........... 370/389, 370/338, 390, 216, 250, 474; 709/244; 712/300
See application file for complete search history.

(56) References Cited

U.S. PATENT DOCUMENTS

| | | | | |
|---|---|---|---|---|
| 5,497,404 A | * | 3/1996 | Grover et al. | 375/240.27 |
| 5,751,719 A | * | 5/1998 | Chen et al. | 370/473 |
| 5,905,727 A | * | 5/1999 | Christensen et al. | 370/395.3 |
| 5,982,296 A | * | 11/1999 | Wakasa et al. | 370/392 |
| 6,009,488 A | | 12/1999 | Kavipurapu | |
| 6,128,283 A | * | 10/2000 | Sabaa et al. | 370/236 |
| 6,574,668 B1 | * | 6/2003 | Gubbi et al. | 709/237 |
| 6,631,466 B1 | * | 10/2003 | Chopra et al. | 712/300 |
| 7,013,419 B2 | * | 3/2006 | Kagan et al. | 714/749 |
| 2002/0073216 A1 | * | 6/2002 | Gaur | 709/230 |

* cited by examiner

Primary Examiner—Jason E Mattis
(74) Attorney, Agent, or Firm—Blakely, Sokoloff, Taylor & Zafman LLP

(57) ABSTRACT

Methods and systems include establishing a connection between two agents, storing a transaction header for data packets being transmitted from one agent to the other, transmitting the packets, updating the transaction header after successful transmission of one or more packets, and re-transmitting the updated transaction header when a disconnect event occurs. The re-transmission of the updated transaction header allows for an efficient re-start or re-connect between the agents of a previously disconnected transmission in a computer network system.

9 Claims, 4 Drawing Sheets

METHOD AND APPARATUS FOR HEADER UPDATING

FIELD OF THE INVENTION

This invention relates to communicating data packets over a network.

BACKGROUND

In networking, virtually every computer host sends and receives information using a predetermined network communication protocol. In network communication protocols, data packets are sent from a source to a destination. When data packets are sent, the communication protocol first sends a header, the portion of the packet having information that guides the packet to its correct destination. Once the header is successfully received, a transmission path is established and ensuing packets can flow from source to destination.

DETAILED DESCRIPTION

As described below, methods and systems include establishing a connection between two agents, storing a transaction header for data packets being transmitted from one agent to the other, transmitting the packets, updating the transaction header after successful transmission of one or more packets, and re-transmitting the updated transaction header when a disconnect event occurs. The re-transmission of the updated transaction header allows for an efficient re-start or re-connect between the agents of a previously disconnected transmission in a computer network system.

Figure 1:
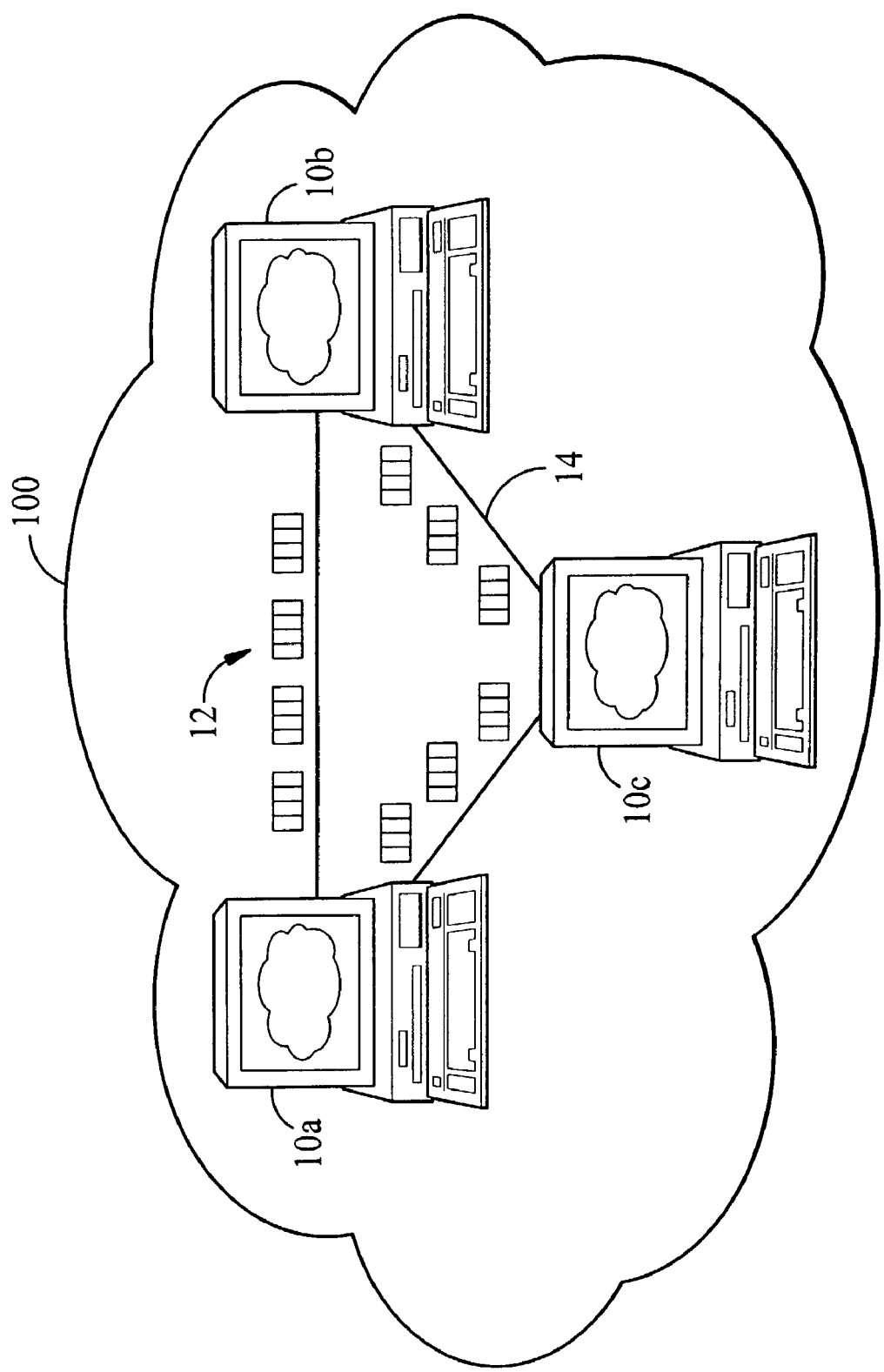
FIG. 1 is a block diagram of a computer network system.

Referring to FIG. 1, a network system 100 includes three host computers 10a-10c each of which represents a device such as a personal computer (PC), router, switch, or workstation. The host computers 10a-10c of the network system 100 may implement a chipset (e.g., Intel® 860 Hublink and Intel® 840 Hublink) based on a particular central processing unit (CPU) such as Intel® Xeon™ processor. The Intel® 860 Hublink chipset, for example, is a high-bandwidth chipset designed for workstation platforms that has a hub interface connecting an input output controller hub (not shown) to a particular processor controller (not shown) designed for the Intel® Xeon™ processor.

In operation, the host computers 10a-10c send and receive data packets 12 through data transmission paths 14 that interconnect the computers. The data packets 12 include bundles of data, in binary form, organized in a specific way for transmission. Depending upon the specific protocol of the computer network system 100, data packets 12 may represent blocks, frames, or cells. The data packets 12 include data or payload to be transmitted through the computer network system 100. In other words, the data packet 12 represent the entire data structure containing a message or information which the host computer 10a desires to successfully transmit to the host computer 10b. The host computers 10a-10c also transmit certain control information encapsulated in a special header packet 16 having header information (FIG. 2), which is described in greater detail below.

Figure 2:
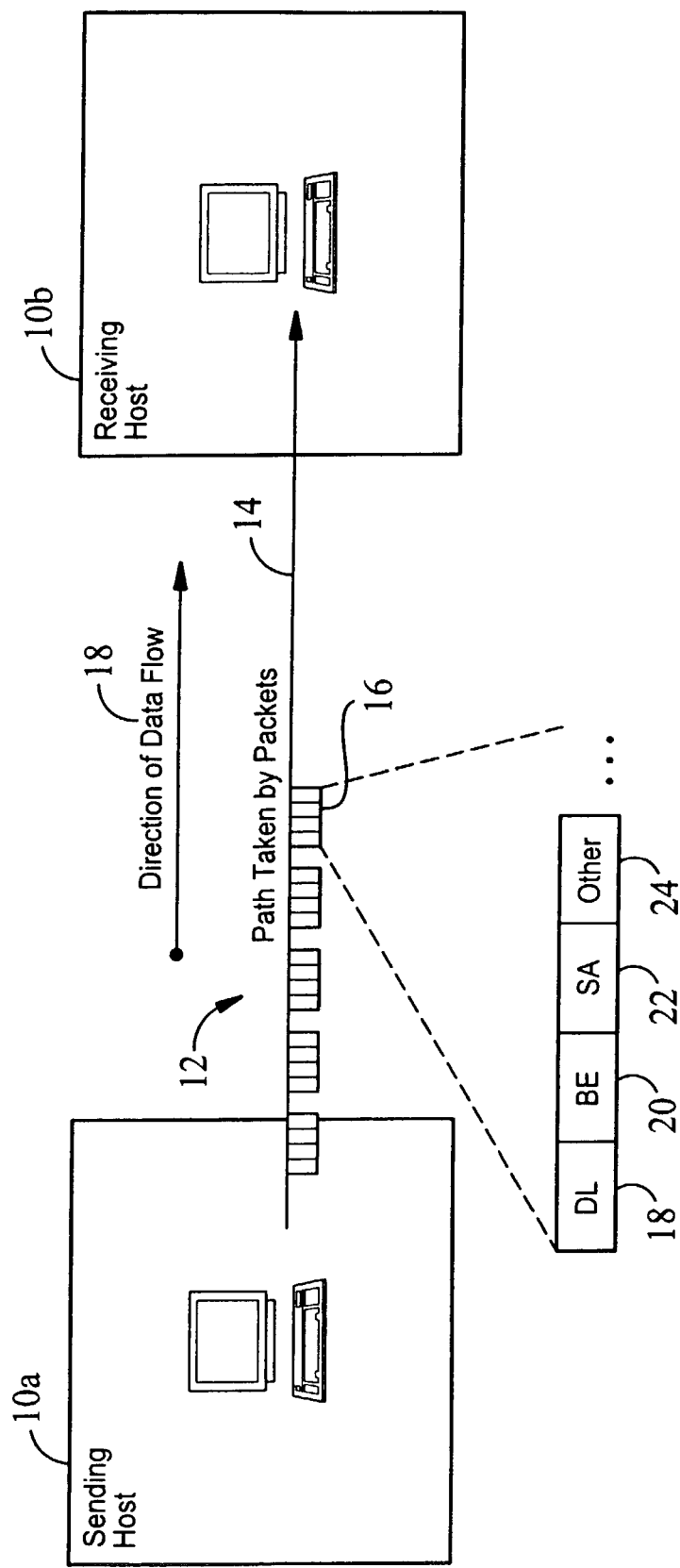
FIG. 2 is a block diagram of host computers in the network system of FIG. 1.

Referring to FIG. 2, the host computers 10a and 10b of the computer network system 100 are shown in greater detail. In this example, the host computer 10a is a sending host and the host computer 10b is a receiving host. The sending host 10a and the receiving host 10b are connected via the data transmission path 14 which has a unidirectional data flow 18. For purposes of simplicity, only the unidirectional data flow 18 is shown although transmission of packets between the sending host 10a and the receiving host 10b can be bi-directional.

In operation under a network protocol such as a protocol used for the Intel® 860 Hublink chipset, the data transmission path 14 carries the data packets 12 and the header packet 16 from the sending host 10a to the receiving host 10b. The header packet 16 includes information which will guide the transmission of the data packet 12 to the correct destination. The header information is somewhat analogous to addresses on an envelope. To keep track of who the envelope is from and who it is going to, like the header packet 16, an envelope contains addresses of both the sender and the recipient. Moreover, the header packet 16 also contains coding to handle transmission errors and establish flow control of the data packets 12. In particular, the header packet 16 includes several distinct units or fields of information such as the sending host 10a's and receiving host 10b's addresses, precedence level, routing instructions, byte enable, packet length, synchronization pulses, and a description of what to do with the data packets 12 when they arrive at the receiving host 10b. Therefore, a great deal of information exists in the header packet 16, including instructions to routers, switches, bridges.

Still referring to FIG. 2, the header packet 16 of an exemplary data packet 12 includes a data length field 18, a byte enable field 20 and a start address field 22, including additional other header fields 24 with various types of control information (not shown).

The data length field 18 determines the number of data packets 12 being transmitted. When the network protocol used sends data packets 12 across the data transmission path 14, the network protocol may send the data sequentially so that the data can arrive at the destination, i.e., receiving host 10b in the correct order. To accomplish this, the network protocol can break the information to be sent into data packets 12 and first send the header packet 16 at the beginning of the transmission, enabling the data packet 12 to be forwarded to the receiving host 10b.

Figure 4:
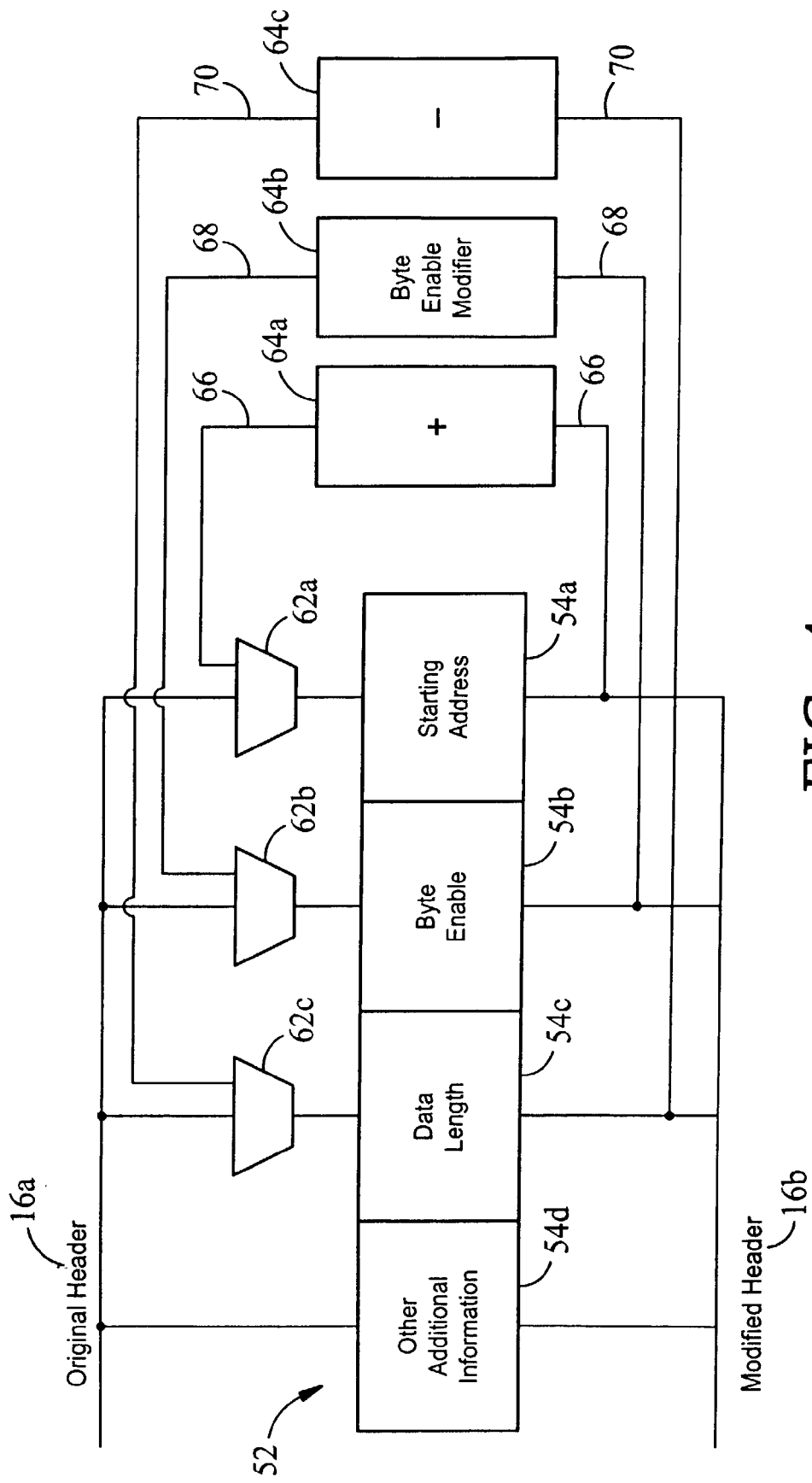
FIG. 4 is a schematic diagram illustrating the combination logic for a host computer of FIG. 2.

The byte enable field 20 describes which of the bytes fetched by a processor (not shown) of the host computers 10a-10c (FIG. 1) are actually being requested from a set of registers (FIG. 4). Each bit in the byte enable field 20 represents a byte in the eight bytes that are fetched by the processor. If a bit is a zero, the processor requested the associated byte. If a bit is set to 1, the byte was not requested. The most significant bit represents the most significant byte. For example, if the processor requests that all eight bytes be fetched, the byte enable field is 0x00. If only the upper four bytes are being requested, the byte enable field is 0x0f in hexadecimal notation. The start address field 22 indicates a numeric value that is assigned to each successive data packets 12 for setting a different starting address for re-transmission. That is, the start address field 22 represents the start address of a new transmission.

The operation of the dynamic updating of the header packet 16 in the network system 100 (as shown in FIG. 2) is described below with reference to FIGS. 3 and 4.

Under the network protocol described above, FIG. 3 illustrates the flow of operations between sending and receiving host computers of FIG. 2. The sending host 10a sends the header packet and stores (104) the original header, i.e., the header packet 16, described above in FIG. 2. At this point, the receiving host 10b can also reject all of the data packets 12 by either disconnecting upon receiving the header packet 16 or upon receiving the first data packet 12. If the receiving host 10b accepts the data packets 12, thereafter, successive data packets 12 are immediately sent (106a-106f) without requiring acknowledgement by the receiving host 10b that the data packets 12 have been received. The transmission of the successive data packets 12 occurs via the data transmission path 14 (FIGS. 1 and 2) from the sending host 10a to the receiving host 10b in a succession of transmissions. As each successive data packet 12 is successfully delivered to the receiving host 10b without a disconnect event occurring, the sending host 10a dynamically stores, updates, and modifies each of the fields 18, 20, 22 and 24 of the header 16 (108a-108e).

If at any point, the receiving host 10b produces a disconnect request (118) and can no longer receive any further data packets 12, it takes a pre-determined amount of time for the sending host 10a to receive the disconnect request (111) sent by the receiving host 10b. During this predetermined amount of time, any data packets 12 (e.g., four data packets) in the process of being sent (112) to the receiving host 10b is lost or dropped. Thus, no data packets 12 are received (114) after a disconnect event has been generated by the receiving host 10b, and the receiving host 10b disconnects. For example, the scenario described above occurs when there is congestion in computer networks or the current load on the network is beyond capacity, network performance can collapse completely, and almost no data packets 12 are delivered. Various congestion management techniques and protocols relieve congestion without the loss of data packets. Notably, in many congestion management solutions, the header packet 16 which plays a critical role can be used to allow congestion management techniques to lessen or eliminate congestion and restore data flow as quickly and as smoothly as possible. For instance, a disconnect event may be prompted by network failure, hardware problems, network congestion, or full capacity buffers in the receiving host 10b may commonly cause disconnect events to occur.

To re-establish connection and continue transmitting data packets 12, the sending host 10a fetches the updated header (16b) in the memory unit of the sending host 10a, at which time it is ready to re-establish connection with an updated header packet 16b (FIG. 4). The sending host 10a is ready to re-establish the data transmission path 14 (110) at the point of the previous disconnect (112) and re-send the four data packets 12 from the point of disconnect which were lost or not received by the receiving host 10b. Therefore, the sending host 10a only sends the data packets 12 from the point of disconnect without having to re-send all the information which was already sent to the receiving host 10a, but only having to re-send the data packets 12 which were lost followed by the successive data packets 12 not yet sent to the receiving host 10b after the point of disconnect. To this end, the sending host 10a transmits the updated header packet 16b (110), which has been modified by the previous updates. Accordingly, the data transmission must occur from a different starting point and the data packets 12 will now have a different length. Other fields, which have been updated, will also include new, modified information in the information fields of the original header packet 16. The details of how the header packet 16 is dynamically updated is described below.

Figure 3:
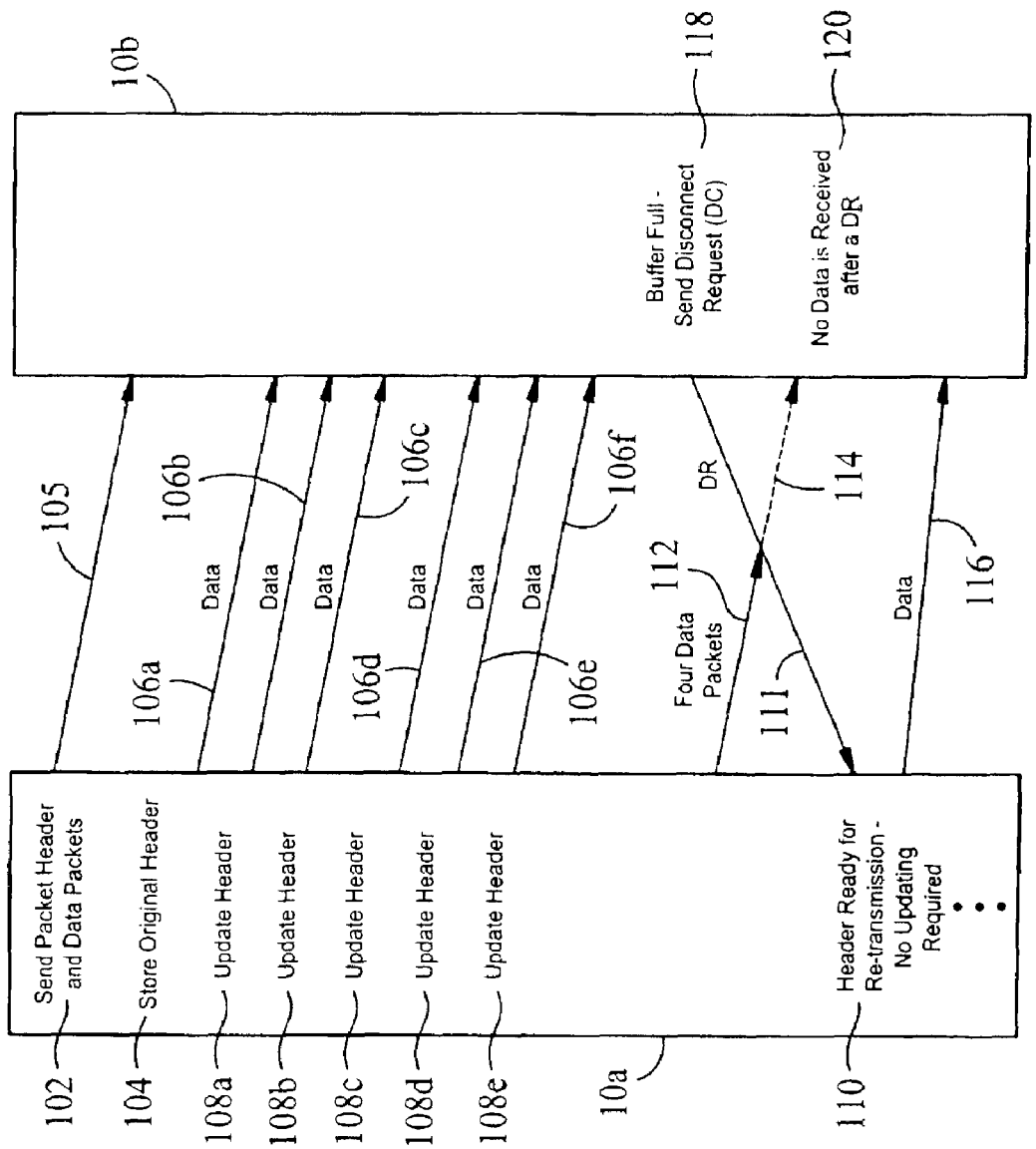
FIG. 3 illustrates the flow of operations between sending and receiving host computers of FIG. 2.

Referring to FIG. 4, the dynamic updating process 200 of FIG. 3 is described by continuous change and activity of the data flow between the sending host 10a and the receiving host 10b. The sending host 10a includes, for example, a memory unit 52. The memory unit 52 includes registers 54a-54d, in the microprocessor of the sending host 10a that provides a place for passing data from one instruction to the next instruction. Thus, each of the registers 54a-54d is large enough to hold an instruction, e.g., 32 or 64 bits in length. For example, the register 54a holds a memory space for storing the starting address of the data packets 12 included in the start address field 22 of the header packet 16. The register 54b holds a memory space for storing a numerical value representing whether the byte_enable field 20 of the header is turned ON or OFF. The register 54c holds a memory space for storing the numerical value included in the data length field 18, and the register 54d holds the memory space for the additional other header fields 24.

The sending host 10a includes combination logic units, i.e., multiplexers 62a-62c that are connected to control devices 64a-64c. When the original header 16a is stored by the sending host 10a upon receipt of the ACK from the receiving host 10b (104 of FIG. 3), each of the fields 18-22 of the header 16a are stored in each of the corresponding registers 54a-54d in the memory unit 52. Upon successive transmissions of data packets 12 (106b-106f of FIG. 3) to the receiving host 10b and successive updates of the header 16a (108a-108c of FIG. 3), the multiplexers 62a-62c correspondingly update the values of the registers 54a-54d using the control devices 64a-64b.

For example, the fields 18, 20, 22, and 24 of an original header 16a are stored in the registers 54a-54d of the memory unit 52. After receiving a successful ACK confirmation that a subsequent data packet 12 has been received, the multiplexers 62a-62c modify the values stored in the registers 54a-54d via the control devices 64a-64c. The starting address field 22 is incremented through a bus 66, the byte enable field 20 is modified through a bus 68, and the data length field is decremented through a bus 70. Consequently, the dynamic updating process illustrated in FIG. 4 produces a modified updated header 16b.

In the example described above in conjunction with FIGS. 2 and 3, various other information and fields can be included in the header packet 16 in the additional other header fields 24 such as error correction (e.g., CRC, header checksum), version, header length, type of service, identification, flags, fragment offset, and the like. Using the additional other header fields 24, the network system 100 can determine the optimum path for the data packets 12 to take to the final destination. These additional other header fields 24, in addition to the data length field 18, the byte enable field 20, and the start address field 22, are dynamically updated for efficiently re-starting re-transmission of data packets 12 in the data transmission path 14 upon the occurrence of a disconnect event.

Other embodiments are within the scope of the following claims.

What is claimed is:

1. A method comprising:

storing a header information describing a plurality of packets to be successively transmitted from a first agent to a second agent in network, wherein the header information is stored within the first agent;

starting transmission of the plurality of packets autonomously by the first agent to the second agent, beginning with a header packet that includes the header information;

updating the stored header information within the first agent each time the first agent learns of a packet from the plurality of packets that is successfully received by the second agent in order to create updated header information describing a remainder of the plurality of packets not yet known by the first agent to have been successfully received by the second agent;

modifying the header packet using the updated header information each time the stored header information is updated to form an updated header packet; and restarting transmission of the plurality of packets autonomously by the first agent to the second agent following a disconnect event, beginning with the updated header packet, followed by a first packet of the remainder of the plurality of packets not yet known by the first agent to have been successfully received by the second agent prior to the disconnect event, wherein the updated header information was updated within the first agent prior to the disconnect.

2. The method of claim 1 wherein updating the header information is performed upon each receipt of an acknowledgement signal from the second agent.

3. The method of claim 1 wherein updating the header information includes modifying a plurality of header fields including at least one of a data length field, a starting address field, a byte enable field, and a header checksum field.

4. A system comprising:

a first agent including a storage unit to store header information;

a second agent, wherein the first agent is to successively transmit a plurality of packets to the second agent through a network, beginning with a header packet that includes header information describing the plurality of packets; and a device coupled with the first agent to update the stored header information within the storage unit each time the first agent learns of a packet from the plurality of packets that is successfully received by the second agent, in order to create updated header information describing a remainder of the plurality of packets not yet known by the first agent to have been successfully received by the second agent and to modify the header packet each time the first agent learns of a packet from the plurality of packets that is successfully received by the second agent and create an updated header packet;

wherein the first agent is to autonomously restart transmission of the plurality of packets to the second agent following a disconnect event, beginning with the updated header packet that includes the updated header information which was updated within the storage unit prior to the disconnect, followed by a first packet of the remainder of the plurality of packets not yet known by the first agent to have been successfully received by the second agent prior to the disconnect event.

5. The system of claim 4 wherein the device is to update the header information upon each receipt of an acknowledgment signal from the second agent.

6. The system of claim 4 wherein the device is to modify a plurality of fields of the header information including at least one of a data length field, a starting address field, a byte enable field, and a header checksum field.

7. A computer readable media storing instructions which when executed by a processor cause the processor to implement a method, the method comprising:

storing a header information describing a plurality of packets to be successively transmitted from a first agent to a second agent in network, wherein the header information is stored within the first agent;

starting transmission of the plurality of packets autonomously by the first agent to the second agent, beginning with a header packet that includes the header information;

updating the stored header information within the first agent each time the first agent learns of a packet from the plurality of packets that is successfully received by the second agent in order to create updated header information describing a remainder of the plurality of packets not yet known by the first agent to have been successfully received by the second agent;

modifying the header packet using the updated header information each time the stored header information is updated to form an updated header packet; and restarting transmission of the plurality of packets autonomously by the first agent to the second agent following a disconnect event, beginning with the updated header packet, followed by a first packet of the remainder of the plurality of packets not yet known by the first agent to have been successfully received by the second agent prior to the disconnect event, wherein the updated header information was updated within the first agent prior to the disconnect.

8. The computer readable media of claim 7 wherein updating the header information is performed upon each receipt of an acknowledgement signal from the second agent.

9. The computer readable media of claim 7 wherein updating the header information includes modifying a plurality of header fields including at least one of a data length field, a starting address field, a byte enable field, and a header checksum field of the header packet.

* * * * *